Patented Jan. 22, 1929.

1,700,055

UNITED STATES PATENT OFFICE.

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA.

LUBRICANT AND METHOD OF MAKING THE SAME.

No Drawing.   Application filed July 13, 1920.   Serial No. 395,941.

Lubricants now used are composed mainly of either mineral oils, hydrocarbons or mineral oils blended with certain fatty oils; or for special purposes fatty oils alone are used. To give greater body to heavier lubricants it is common to add soaps, and also certain other solid additions are sometimes made.

In my copending application, Serial No. 272,567, filed January 22, 1919, for Method of making partial oxidation products from mineral oils, I have described a process of partial oxidation of mineral oils in the presence of catalysts by which valuable partial oxidation products are obtained. In carrying out the said process, I pass a mixture of mineral oil vapor and air in the proper proportions through a catalytic material, such as the blue oxides of molybdenum, at a temperature of from about 230° C. to about 500° C., steam being used or not as desired. The temperature will vary with the distillate used, and also in accordance with the other factors, such as the air ratio, kind of catalyst used, etc. By this process, the material condensed contains products of different molecular weights in the range from alcohols to aldehyde fatty acids, including aldehydes and probably anhydrides and aldehyde alcohols.
I have found as a result of long experimenting that these intermediate oxidation products, especially those boiling in intermediate ranges, may be used as lubricants either with little or no further treatment; or in some cases, with certain chemical treatment hereinafter described. This discovery enables my process to produce excellent lubricants from inferior petroleum fractions at low cost.

The following description will show the flexibility of my process products, enabling them to be used through practically the entire range of industrial lubrication.

First procedure.

Under this procedure, I preferably operate my partial oxidation process so that the product shall contain a preponderance of aldehydes and alcohols with some unchanged hydrocarbons. For this purpose the temperature employed in the process may be below that at which there is a preponderence of aldehyde fatty acids in the product; or be a higher temperature with considerable reduction in the air ratios to raise the aldehyde content in the product. These mixtures, containing large percentages of aldehydes and alcohols, will vary in viscosity and other physical properties, according to the particular petroleum fraction from which they are made. Ordinary kerosene thus treated will give a relatively thin mixture, while the heavier fractions will give more viscous mixtures, the viscosity increasing with the average molecular weight of the fraction treated up to the limit of practical working and vaporizing of the mineral oil.

Under this first procedure, I may, if desired, thicken the product or make it more viscous by reacting on the condensed mixture with any of the well known chemical condensation agents to bring about a union of the aldehydes and alcohols and form bodies of the acetal type. These bodies of acetal type are of higher molecular weight than their original components, and in addition, there will be some polymerization of the aldehydes, thus adding to the quantity of high molecular weight bodies present. The small amount of acids present are esterified by reacting with alcohols present. This also adds to the proportion of high molecular weight bodies. The presence of a large amount of these condensation products gives more body to the mixture from any given fraction or distillate, from that of the original partial oxidation product mixture on up to the highest viscosity possible by the formation of the maximum amount of condensation product. This thickening may be carried to any desired stage up to this point. One of my preferred methods of applying the condensation will be noted among my examples hereinafter recited.

Second procedure.
In case the orignal oxidation product mixture contains a material proportion of aldehyde fatty acids, these acids may be wholly or mainly removed by treatment with alkalis, giving soap formation, and after removal of the saponified acids, the residue will approximate the same composition as noted under the first procedure. It can be varied in the same manner as in the first procedure, as by varying the fraction or distillate treated, the amount of condensation product formed in a given mixture, etc. A larger percentage of free aldehyde fatty acid may, if desired, be left in the mixture, than would bring the mixture within the ordinary specifications for blended lubricants.

Third procedure.

(a) Where it is desirable to either limit the amount of soap produced or to make a product of higher viscosity than could be obtained from a given fraction by the first or second procedures, I may treat the product containing a material amount of aldehyde fatty acids as derived from the partial oxidation process with a suitable chemical condensation agent. In addition to the formation of bodies of the acetal type and polymerization above noted, this will cause polymerization of the aldehyde acids and also the formation of a material proportion of waxes by the union of the aldehyde acids with the alcohols. All three reactions act to thicken the partial oxidation mixture from a given petroleum fraction and increase the viscosity to any desired degree up to the maximum possible, depending on the concentration of the bodies present which are amenable to the above reactions. Any free fatty acid or fatty acid anhydrides remaining may then be removed by the usual alkali treatment, if desired. Since the majority of lubricant specifications allow but two percent for the free fatty acid, calculated as oleic acid, I prefer to reduce the fatty acids below this point.

The method followed in the condensing and polymerizing step may be varied and any of the usual condensation agents may be used, such as phosphoric acid, phosphorus pentoxide, calcium chloride preferably in the presence of a stream of hydrochloric acid gas, zinc chloride in the presence of hydrochloric acid gas, or hydrochloric acid gas alone. Any of the halogen acids (commercially available) may be used to replace the hydrochloric acid.

(b) I may also vary this procedure by mixing the product of a high oxidation run which contains a large percentage, preferably a predominance of aldehyde fatty acids, with the product of a lower oxidation run made under conditions which give a predominance of aldehydes and alcohols. This mixing is to insure, when desirable, the utilizing of all the fatty acids, as I have found that in taking a mixture with a large percentage of oxygenated organic acids and subjecting it to polymerizing and condensation reactions, I have always had a considerable percentage of free acid left over to be removed by the alkali treatment. In the mixing operation, these oxygenated organic acids will combine with the alcohols to form liquid mineral waxes and reduce the amount of free acid remaining. The waxes to which I refer are chemically esters of monatomic alcohols.

The following is a specific example under (a) of this third procedure. A partial oxidation product made by treating Pennsylvania gas oil by my partial oxidation process gave the following mixture:

| | Per cent. |
|---|---|
| Total of aldehyde fatty acids (free and combined) | 53 |
| Aldehydes | 18 |
| Alcohols and heavy hydrocarbons | 17.5 |
| Light products, mostly hydrocarbons distilling under 200° C. | 11.5 |

This product was distilled to remove all bodies boiling under 200° C. The specific gravity of the residue at 18° C. was .910 and the free acid present (calculated as oleic acid) was 3.7%.

This liquid residue was heated to about 200° C., passing a continuous stream of dry hydrochloric acid gas through it for about two hours.

During this step, the free acid was reduced to about 2.5% and the acetyl value greatly reduced, the specific gravity remaining about the same.

The product was then washed several times with saturated sodium bicarbonate solution alternately with cold water. This brought the free acid, calculated as oleic acid, down to .95%. The product was then of a syrupy consistency and under viscosity test showed a very satisfactory viscosity curve. This viscosity curve continued at higher temperatures even better than the curves of commercial lubricants for the same general purpose.

Fourth procedure.

Instead of depending entirely upon the partial oxidation products of my partial oxidation process for the lubricant material, I may vary the process as follows: Taking a partial oxidation mixture high in aldehyde fatty acids and their anhydrides, I add sufficient glycerine, and proceed as above with chemical condensation agents. Then to the condensation and polymerization products obtained, I add glycerides of the fatty acids. Instead of glycerine, (glycerol), I may add glycols where such is available in commercial quantities, the condensation products introduced by this addition being the glycol ester of the acids. These new products are particularly valuable as substitutes for the high priced fatty oils which have been used in the manufacture of blended lubricants.

The above procedure may be varied by isolating the oxygenated organic acids from the reaction mixture before esterifying them with either glycerine or glycol. A further variation consists in polymerizing the free aldehyde acids by any of the well known methods, before proceeding with the esterification reaction.

By varying the above procedures in various ways, as well as the original distillates treated and the manner of carrying out the partial oxidation process, I can obtain a widely varied line of lubricants suitable for practically the entire range of industrial use. The thinner products will serve as lubricants in some cases without any blend. The thickened products are suitable as lubricants particularly for cheap substitutes for animal or vegetable oils, blended with mineral oils, which are desirable in steam engine cylinder lubrication. I may also add certain amounts of these aldehyde fatty acid soaps, particularly the sodium soaps, to a given lubricant, to impart more "body" and increase its viscosity.

The "thickened" products described above have the property possessed by castor oil, i. e., these products are almost insoluble in petroleum ether. This makes them suitable as a castor oil substitute in certain kinds of lubrication.

It is established in the lubricating trade, that to make mineral oils suitable for steam cylinder lubrication, it is necessary to blend animal or vegetable oils (fatty oils) with mineral oils of high viscosity. For this character of lubrication, certain of the above described products will serve as substitutes for animal and vegetable fatty oils, either in blending with mineral oils or alone, (after removal of the excess of free fatty acids). For this purpose I can use my ordinary oxidation product mixture without any treatment thereof except the removal of the excess free fatty acids; or I may take the residue remaining after both free acids and waxes have been saponified.

In many cases I have at this point the substances suitable for grease manufacture, the only addition necessary being that of water.

I may also use the partially or completely saponified reaction mixture above, in conjunction with a mineral oil of suitable composition and water, to prepare a grease.

The preparation of these greases may be varied by using combinations of soda and lime soaps of the aldehyde acids and water, or with mineral oils and water, the soaps being added with or without removal from other substances of the reaction mixture, as desired.

I have found that the above soaps, particularly those of lime and soda, are applicable in the preparation of greases. For this purpose it is not as a rule necessary to separate the acids from the oxidation mixture as the other substances all serve as lubricants. The procedure then would usually consist in saponification either with lime or soda, either to the point of removing free fatty acids, or the free fatty acids and all or a part of the combined acids. The removal of the lighter portion of the original partial oxidation product, as for example, by distillation, may be used in any case, and similarly, portions of the aldehyde fatty acids may be removed.

Many other variations may be made in the process, the proportion of the range of products used, the blending, etc., without departing from my invention, since I consider myself the first to discover the value of partial oxidation products ranging from alcohols to aldehyde fatty acids as lubricants, either alone, chemically treated or blended.

By the words "aldehydes," "aldehyde fatty acids," and "alcohols" in my claims, I intend to cover these organic compounds, whether chemically varied or changed or not during the preparation of the lubricant. By the term "mineral oil" in the claims, I intend to cover and include any oil of mineral origin such as bitumen oils and the product of the low temperature distillation of coal.

I claim:

1. A lubricant containing a material proportion of a mineral oil partial oxidation product in the range from alcohols to oxygenated organic acids.

2. A lubricant containing a mixture of mineral oil aldehydes of different molecular weights.

3. A lubricant containing a material proportion of a heavier portion of a mineral oil partial oxidation product in the range from alcohols to oxygenated organic acids.

4. A lubricant containing a material proportion of a mineral oil partial oxidation product in the range from alcohols to oxygenated organic acids, part of the oxygenated organic acids having been removed.

5. A lubricant containing the heavier portion, and a part of the acid content, of a mineral oil partial oxidation product in the range from alcohols to oxygenated organic acids.

6. A lubricant containing a material proportion of a salt of an oxygenated organic acid.

7. A lubricant containing an oxygenated organic acid soap.

8. A lubricant containing a material proportion of a mineral oil partial oxidation product in the range from alcohols to oxygenated organic acids mixed with other liquid lubricating material.

9. A lubricant containing a salt of an oxygenated organic acid and also containing other lubricating material.

10. A lubricant containing a material proportion of condensation products of aliphatic aldehydes.

11. A lubricant material containing the heavier portion, and a part only of the free acids of a mineral oil partial oxidation product.

12. A lubricant containing a material proportion of the polymerized aldehyde fatty acids and waxes formed of the aldehyde acids and the alcohols.

13. A lubricant containing a material proportion of the polymerized oxygenated organic acids.

14. A lubricant comprising a mixture of the partial oxidation product containing a relatively larger percentage of oxygenated organic acids and a partial oxidation product containing a relatively smaller percentage of oxygenated organic acids with aldehydes and alcohols.

15. In the manufacture of lubricants, the step consisting of removing from the partial oxidation product of a mineral hydrocarbon the more volatile portion thereof and using the less volatile portion for lubricant material.

16. In the manufacture of lubricants, the step consisting of mixing a mineral oil partial oxidation product in the range from alcohols to oxygenated organic acids with another liquid lubricating material.

17. In the manufacture of lubricants, the steps consisting of removing a major portion of the oxygenated organic acids present in a mineral oil partial oxidation mixture and mixing the residue with other lubricating material.

18. In the manufacture of lubricants, the steps consisting of removing the more volatile portion of a mineral oil partial oxidation product in the range from alcohols to oxygenated organic acids and also removing a portion of the acid present by chemical treatment.

19. In the manufacture of lubricants, the step consisting of chemically condensing a mineral oil partial oxidation product in the range from alcohols to oxygenated organic acids.

20. A lubricant containing a material portion of an aldehyde derived from mineral oil.

21. A lubricant containing a material proportion of alcohols and aldehydes derived from mineral oil.

22. A lubricant containing esters of monatomic alcohols and oxygenated organic acids derived from mineral oils.

23. A lubricant containing aliphatic aldehydes and esters of monatomic alcohols.

24. A lubricant containing a material proportion of a mineral-oil partial-oxidation product in the range from alcohols to oxygenated organic acids, thickened by chemical condensation.

25. In the manufacture of lubricants, the steps consisting of partially oxidizing a hydrocarbon while in the vapor or gaseous phase, condensing part of the product, and then removing from the condensate a portion of the free acids present by chemical treatment.

26. In the manufacture of lubricants, the step consisting of saponifying the oxygenated organic acids resulting from gaseous-phase partial-oxidation of hydrocarbons.

In testimony whereof, I have hereunto set my hand.

JOSEPH HIDY JAMES.